Oct. 3, 1944.   J. W. SMITH   2,359,334
ELECTRIC TEMPERATURE INDICATOR
Filed May 19, 1941
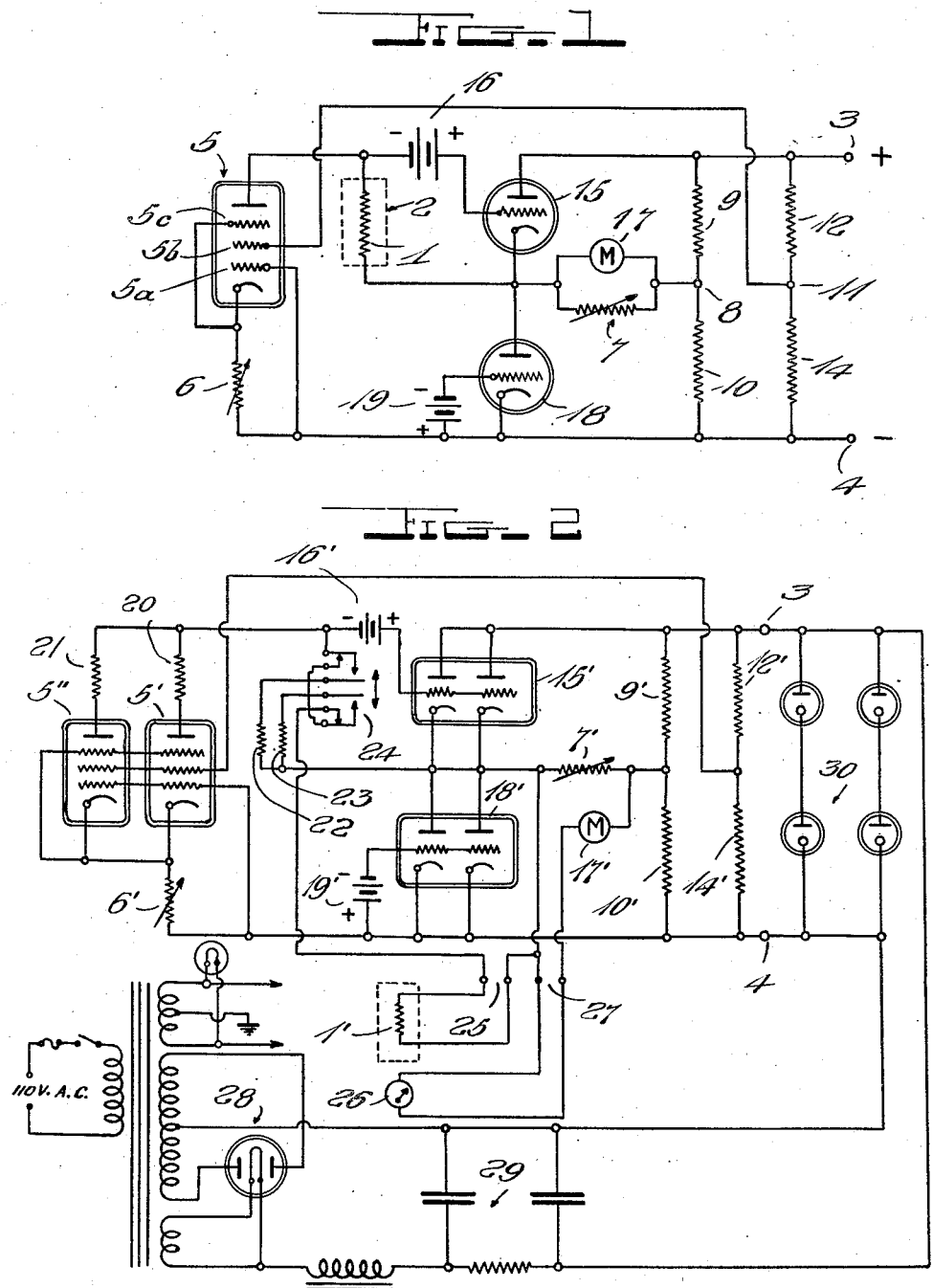
INVENTOR.
John William Smith,
BY
John B. Brady
Attorney Patented Oct. 3, 1944

2,359,334

UNITED STATES PATENT OFFICE 2,359,334

ELECTRIC TEMPERATURE INDICATOR

John William Smith, Cedar Rapids, Iowa, assignor to Collins Radio Company, Cedar Rapids, Iowa, a corporation of Iowa Application May 19, 1941, Serial No. 394,181

8 Claims. (Cl. 73—362)

My invention relates broadly to temperature indicators and more particularly to an electronic temperature indicator adaptable for automatically recording temperature and temperature variations in a variety of systems.

One of the objects of my invention is to provide an electronic temperature indicator which may be readily associated with other electrical measuring instruments in a system for recording and coordinating various observed phenomena.

Another object of my invention is to provide an improved temperature indicator employing a thermo-electric element in connection with an electron tube measuring circuit for meter indications of temperature.

A further object of my invention is to provide an improved temperature indicator employing a resistor having a constant temperature coefficient of resistance and electric circuit means for detecting the changes in resistance in terms of degrees of temperature, in accordance with a linear temperature-resistance relationship.

Still another object of my invention is to provide a temperature indicator employing a resistor subject to change in resistance with change in temperature, means for supplying current to the resistor to produce a difference of potential thereacross proportional to temperature, and means for measuring the difference of potential; and furthermore, it is an object of my invention to provide a balanced electron tube circuit for measuring the potential difference across the resistor due to temperature, including an arrangement for counteracting the electron tube current in the metering circuit.

Other and further objects of my invention reside in the system and circuit arrangements hereinafter more fully described with reference to the accompanying drawing, in which:

Figure 1 is a schematic diagram of the basic circuit arrangement employed for temperature indication in accordance with my invention; and Fig. 2 is a schematic diagram of one practical embodiment of my invention for commercial use.

Referring to the drawing in more detail, reference character 1 in Fig. 1, indicates a resistor subject to changes in resistance with temperature and disposed in the medium, outlined by dotted line at 2, the temperature of which is to be observed. The medium may be solid or fluid, or gaseous or liquid. The resistor 1 preferably has a constant temperature coefficient of resistance in order that linear meter calibration may be provided.

Direct current is supplied to the resistor 1 from a source connected at terminals 3 and 4, through an electron tube such as the pentode at 5, the cathode of which is connected through a variable resistance at 6 to the negative terminal 4, and the anode of which is connected through the resistor 1 and a variable resistance 7 to point 8 in a potential divider comprising resistances 9 and 10 connected between terminals 3 and 4. The control grid 5a of pentode 5 is connected directly to the lead from the negative terminal 4, while the suppressor grid 5c is connected to the cathode. The screen grid 5b is biased through connection at 11 to a potential divider comprising resistances 12 and 14 connected between terminals 3 and 4.

The pentode 5 supplies a constant current to resistor 1 which varies in resistance with temperature and thus has a potential difference thereacross proportional to temperature. The current through the pentode is controlled by the cathode resistor 6 by which the bias on the control grid is adjusted for obtaining constant current through resistor 1. An electron tube voltmeter is employed to measure the potential difference across resistor 1, and comprises a triode 15, the control grid of which is biased from a source at 16 to obtain linear operation of the triode for the range of temperature variation to be measured. The triode 15 is energized by the difference of potential across resistor 9, the anode-cathode circuit including the resistors 9 and 7, with voltmeter 17 connected across the resistor 7 which is variable for adjusting the sensitivity of the instrument and permitting full scale deflection in the meter 17 for the maximum temperature anticipated. The grid-cathode circuit includes the temperature responsive resistor 1, for varying the current through the triode 15 and meter 17 linearly in relation to the temperature, the meter 17 being calibrated in degrees of temperature.

In order to obtain full scale operation of the meter 17, the current drawn by the triode 15 in the absence of a controlling voltage at resistor 1 is counteracted in the meter 17 by an auxiliary current supplied from a triode 18, the anode of which is connected to the cathode of tube 15. The triode 18 is energized by the difference of potential across resistor 10, the anode-cathode circuit including the resistors 7 and 10 with voltmeter 17 connected, as described, across resistor 7. The grid of tube 18 is given a fixed bias from a source at 19 to produce the required counteracting current in the output.

The arrangement shown in Fig. 1 may be regarded, in part, as a balanced bridge circuit, with tubes 15 and 18 forming two arms and resistances 9 and 10 the other two arms connected in series across the source at terminals 3 and 4. The impedance of tube 15, constituting one arm, is varied by the voltage across resistor 1 connected in the grid circuit thereof; and the resulting unbalance of the bridge is indicated by meter 17 connected at the alternate junctions of the arms of the bridge and shunted by resistance 7.

The pentode 5 is so arranged in circuit with resistor 1 that the meter 17 when calibrated accurately at two points on its scale produces a physical movement of the pointer that is linear with respect to changes in temperature of the resistor. Once calibrated the apparatus holds a very high degree of accuracy with normal variations of tube constants for replacement tubes, supply voltages, etc. The selection of a pentode 5 with its electrodes connected as shown insures reliable operation of the measuring system. In practice I have used the 6SK7 tube for this purpose. While negative bias potential is supplied to control grid 5a from the negative side of the direct current source at terminal 4 and may be subject to certain supply circuit variations, such variations are counteracted by the operating voltage from tap 11 in network 12—14, subject to the same variations, that is connected to screen grid 5b. Because it is desirable to have the meter 17 operate over its entire scale, the current drawn by the electron tube voltmeter comprising tube 15 must be balanced out of meter 17. The balancing current desired is obtained from the network consisting of resistances 9 and 10 and triode 18. When operated under favorable conditions; i. e., with a constant control grid potential and a constant screen grid potential with respect to its cathode, a pentode tube is inherently a constant current device.

Ohm's law states that the potential across a resistor is equal to the product of the resistance and of the current through the resistor. If the current is kept constant, the voltage drop across the resistor is directly proportional to the resistance, and if the resistance varies directly with temperature, it is then apparent that the voltage appearing across the resistor is a direct function of temperature.

Referring to the drawing, this resistor is indicated by reference character 1, the constant current being provided by the pentode tube 5. The voltage appearing across resistor 1 is applied to the control grid of triode tube 15. Tube 15 is operated over the linear portion of its grid voltage-plate current characteristic, similar to a class A amplifier. Therefore, the plate current of the tube 15 is directly proportional to the temperature of resistor 1.

Meter 17 has a physical movement of its pointer directly proportional to the current flowing through the meter; therefore, as the meter is connected to read the plate current of tube 15, the physical movement of the meter pointer is directly proportional to the temperature of resistor 1. The current drawn by triode tube 18 is essentially constant and, therefore, does not enter into the expression of the physical movement of the meter pointer except to modify the initial reading of the meter.

Referring to Fig. 2, the commercial embodiment of the invention therein shown differs from the simplified diagram of Fig. 1 in the provision of separate pentodes at 5' and 5" connected in parallel and dual triodes at 15' and 18' having the electrodes thereof also connected in parallel. The two pentodes 5' and 5" and the double triodes 15 and 18' are employed in the commercial embodiment of my invention to provide greater current carrying capacity and ruggedness in the apparatus. Resistors 6', 7', 9', 10', 12' and 14' correspond to the similarly designated resistors in Fig. 1, and bias sources 16' and 19' likewise correspond to the bias sources in Fig. 1. Resistors 20 and 21 are provided to obtain proper current division between the two pentodes 5' and 5". Resistances 22 and 23 are standard resistance elements selectively connected in the grid-cathode circuit of tube 15' by operation of switch 24 in opposite directions, whereby calibration of the meter 17' may be instantly effected. The resistance 1' is the temperature responsive element and is shown connected externally through terminals at 25 for operation as described in reference to Fig. 1. A remote temperature indicating or recording meter is represented at 26 connected through terminals at 27 in series with the indicating meter 17'. The resistor 1' and meter 26 may be located at widely separate points, as may be convenient in various uses of the apparatus represented in Fig. 2.

A conventional arrangement including rectifier 28 and filter 29 is provided for operation from a 110 volt, 60 cycle, commercial source of power, voltage regulating means indicated generally at 30 being connected between the filter 29 and the terminals 3 and 4 in the instrument.

The system of my invention may be readily employed in conjunction with other electrical measuring instruments in arrangements for automatically recording and coordinating various observed phenomena. The material of the resistor 1 or 1' may have either a positive or negative temperature coefficient of resistance which may be relatively low for measurements in a large range of temperature changes, and relatively high for measurements in a smaller range; in either instance, material having a constant temperature coefficient is preferred, for linear calibration of the meter.

Another advantage of the system of my invention is that an indicating meter of comparatively large current capacity can be used instead of a relatively expensive meter of low current rating.

While I have described my invention in certain preferred embodiments, I desire it understood that further modifications may be made therein, and that no limitations upon my invention are intended thereby but only such as are imposed by the scope of the appended claims.

What I claim as new and desire to secure by Letters Patent of the United States is as follows:

1. An electric temperature indicator comprising a resistor having a substantial temperature coefficient of resistance; an electron tube having an anode, a cathode and a control grid; a source of direct current; a circuit including said anode, said resistor, said source and said cathode whereby current is supplied to said resistor; an adjustable resistor connected between the negative side of said source of direct current and said cathode, a connection from said control grid to the negative side of said source of direct current for biasing said grid with respect to said cathode for electronically maintaining the current through the first said resistor constant with change in temperature, whereby a potential difference linearly proportional to temperature is produced; and means calibrated according to temperature for measuring said potential difference in terms of temperature.

2. An electric temperature indicator as set forth in claim 1 wherein said means for measuring the potential difference comprises an electron tube voltmeter connected with the first said resistor, an independent source of potential interposed between the first said resistor and said electron tube voltmeter for biasing the operation thereof, and means energized from the first named source for balancing the meter circuit of said electron tube voltmeter.

3. An electric temperature indicator comprising a resistor having a substantial temperature coefficient of resistance; a source of direct current; means connected with said source for supplying a constant electric current to said resistor for producing a difference of potential thereacross proportional to the temperature of said resistor; an electron tube having an anode, a cathode, a grid and a source of biasing potential; a circuit including said grid, said source of biasing potential, said resistor and said cathode; a meter; a meter circuit including said anode, said source of direct current, said meter and said cathode; and means for balancing the electron tube current in said meter circuit.

4. An electric temperature indicator comprising a resistor having a substantial temperature coefficient of resistance; an electron tube having an anode, a cathode, a screen grid, a suppressor grid and a control grid; a source of direct current; a circuit including said anode, said resistor, said source and said cathode whereby current is supplied to said resistor; an adjustable resistor connected between the negative side of said source and said cathode; a connection between said cathode and said suppressor grid, a connection between said screen grid and said source of direct current, a connection from said control grid to the negative side of said source of direct current for biasing said grid with respect to said cathode for maintaining the current through the first said resistor constant with change in temperature, whereby a potential difference proportional to temperature is produced; a second electron tube having an anode, a cathode and a grid; a second source of direct current; a circuit including the last said grid, said second source of direct current, the first said resistor and the last said cathode; a meter; a meter circuit including the last said anode, said first mentioned source of direct current, said meter and the last said cathode; and means for balancing the electron tube current in said meter circuit.

5. An electric temperature indicator as set forth in claim 4 and including means for energizing the last said means from the first said source of direct current.

6. An electric temperature indicator comprising a source of direct current, a multiple section potential divider connected across said source, a resistor having a substantial temperature coefficient of resistance, means energized by the difference of potential across one section of said multiple section potential divider for supplying a constant current to said resistor for producing a difference of potential thereacross proportional to the temperature of said resistor, an electron tube voltmeter including a meter circuit energized from another section of said potential divider and connected with said resistor for measuring the difference of potential thereacross, and means energized from the first mentioned section of said potential divider and connected with the meter circuit of said electron tube voltmeter for balancing the electron tube current in said meter circuit.

7. An electric temperature indicator as set forth in claim 6 wherein the last said means comprises an electron tube cooperative with said electron tube voltmeter and independently biased to maintain substantially balanced meter circuit conditions at all times.

8. An electric temperature indicator comprising a resistor having a substantially constant temperature coefficient of resistance, a power supply circuit including a tapped potential divider, a multi-grid electron discharge tube including a cathode, a control grid, a screen grid, a suppressor grid and an anode, a connection between said suppressor grid and said cathode, a variable resistor in circuit with said cathode, a connection between the negative side of said power supply circuit and said control grid, a connection between said screen grid and a tap on said tapped potential divider, a Wheatstone bridge circuit including a pair of arms containing resistive elements therein, and a pair of arms each including electron discharge paths, a measuring instrument connected transversely of said arms, a circuit including said anode, said first mentioned resistor and a path to the positive side of said power supply circuit and a parallel circuit connection between said first mentioned resistor and one of the electron discharge paths constituting one of the elements of said Wheatstone bridge circuit whereby a change of current through said first mentioned resistor operates to unbalance said Wheatstone bridge circuit and effect the operation of said measuring instrument.

JOHN WILLIAM SMITH.